United States Patent
Putnam et al.

(10) Patent No.: US 10,597,077 B2
(45) Date of Patent: Mar. 24, 2020

(54) BUCKLING GROOVE FOR INNER TIE ROD BALL JOINT STUDS

(71) Applicant: ZF Friedrichshafen AG, Friedrichshafen (DE)

(72) Inventors: Richard Putnam, Montrose, MI (US); Eric Holmes, Ann Arbor, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 111 days.

(21) Appl. No.: 15/972,304

(22) Filed: May 7, 2018

(65) Prior Publication Data
US 2019/0337563 A1 Nov. 7, 2019

(51) Int. Cl.
  *B62D 7/20* (2006.01)
  *B60G 7/00* (2006.01)
  *B62D 7/16* (2006.01)

(52) U.S. Cl.
  CPC ............... *B62D 7/20* (2013.01); *B60G 7/005* (2013.01); *B62D 7/163* (2013.01); *B60G 2206/016* (2013.01); *B60G 2206/1112* (2013.01); *F16C 2326/24* (2013.01)

(58) Field of Classification Search
  CPC .......... B62D 7/20; B62D 7/163; B60G 7/005; B60G 2206/016; B60G 2206/1112; F16C 2326/24
  See application file for complete search history.

(56) References Cited

U.S. PATENT DOCUMENTS

| | | | |
|---|---|---|---|
| 2,596,885 A * | 5/1952 | Booth | B62D 7/20 403/343 |
| 6,561,715 B2 | 5/2003 | Wasylewski et al. | |
| 7,004,485 B2 | 2/2006 | Spagnuolo et al. | |

FOREIGN PATENT DOCUMENTS

| | | | | |
|---|---|---|---|---|
| DE | 102018102934 A1 * | 8/2019 | ............... | B62D 7/20 |
| JP | 09164972 A * | 6/1997 | ............... | B62D 7/16 |

* cited by examiner

*Primary Examiner* — Faye M Fleming
(74) *Attorney, Agent, or Firm* — Davis & Bujold PLLC; Michael J. Bujold

(57) ABSTRACT

The system and method of making an asymmetrical buckling portion in a linkage member that is formed at the same time a hexagonal holding feature is being formed. The presence of the elongated groove drives the force of a buckling event asymmetrically through the inner tie rod ball stud near the area of failure, which influences the tie rod assembly to buckle in the direction of the groove, prior to other components in the linkage system and thus negates the effects of inner tie rod ball stud run-out tolerances that are present in conventional inner tie rod ball studs formed by machining.

20 Claims, 4 Drawing Sheets

BUCKLING GROOVE FOR INNER TIE ROD BALL JOINT STUDS

FIELD OF THE INVENTION

The present disclosure relates to an improved tie rod ball joint stud and more particularly to tie rod ball joint studs that provide for predictable, buckling.

BACKGROUND OF THE INVENTION

Ball joints are commonly used in motor vehicle steering systems and in motor vehicle suspension systems. Tie rod ends for motor vehicle steering systems typically comprise a ball joint. Such ball joints provide an articulated connection between two relatively movable parts. In a vehicle steering system for a four wheel steer vehicle, for example, ball joints are commonly adapted to be connected to a steering arm of each of a left and a right rear wheel knuckle. Typically, a ball joint for a motor vehicle steering system includes a ball stud with a spherical ball end and a socket member with a spherical socket. A bearing member in the socket receives the ball end and supports the ball end for rotational and pivotal movement.

Conventional tie rod ball joint studs will buckle at the inner tie rod thread; other designs contain buckling regions which are machined into the rod using a lathe. These machined regions are symmetrical about the ball stud axis. The process of machining a buckling region adds an additional step in the manufacturing process, and also adds cost. In some cases, tie rods are manufactured with bends to provide an area for buckling. For tie rods without bends, the machined feature does not improve the accuracy of a buckling event and only lowers the total force required to induce a buckling event in the tie rod. Wherefore it is an object of the present disclosure to overcome the above-mentioned shortcomings and drawbacks associated with conventional tie rod ball joint studs.

SUMMARY OF THE INVENTION

It has been recognized that unpredictable buckling events in conventional tie rods increases the overall repair cost of a vehicle. During groove testing and development, for tie rods, the load required to produce a buckling event is currently varied due to large run-out tolerances. While the type of vehicle crash may dictate the precise direction of a buckle, the tolerances for buckling events in conventional systems varies greatly and thus more expensive parts, such as a relay rod in the steering linkage, or the like, may break prior to a less expensive part, such as an inner tie rod, which drives up the overall cost of maintaining a vehicle.

One aspect of the present disclosure is a linkage member comprising: a shank defining a longitudinal axis and having a ball adjacent a first end and a threaded portion adjacent a second end; the shank having a holding feature which facilitates threaded engagement of the shank with an outer tie rod; and an elongated groove being formed in the holding feature forming an asymmetrical buckling portion, said asymmetrical buckling portion buckling under a predetermined amount of axially applied force applied to the shank.

One embodiment of the linkage member is wherein the asymmetrical buckling portion has a hexagonal cross-sectional configuration and the elongated groove replaces at least one flat of the hexagonal cross-section.

In another embodiment, the elongated groove is a cold formed groove that replaces one flat of the hexagonal cross-section holding feature and is about 3 millimeters in depth, about 16 millimeters in length, and about 6 millimeters in width. Yet another embodiment is wherein said elongated groove is a cold formed groove that replaces two adjacent flats of the hexagonal holding feature and is about 2 millimeters in depth, about 16 millimeters in length, and about 4 millimeters in width.

In certain embodiments of the linkage member, said shank has a diameter in the range of from about 9 millimeters to about 25 millimeters, said shank at said asymmetrical buckling portion has a diameter in the range of from about 9 millimeters to about 22 millimeters.

In yet other embodiments of the linkage member, said elongated groove has a depth in the range of from 1 millimeter to 7 millimeters; said elongated groove has a width in the range of from 5 millimeters to 10 millimeters; and/or said elongated groove has a length in the range of from 12 millimeters to 25 millimeters.

Another aspect of the present disclosure is a vehicle steering linkage member comprising: a socket; and a stud having a ball end portion received in said socket and supported for pivotal movement relative to said socket, said stud having a longitudinal axis, said stud having a shank portion projecting from said socket and centered on said axis; said shank portion of said ball stud including a holding feature, which facilitates threaded engagement of the shank with an outer tie rod; an elongated groove being formed in the holding feature forming an asymmetrical buckling portion, said asymmetrical buckling portion buckling under a predetermined amount of axially applied force applied to the shank.

One embodiment of the linkage member is wherein the asymmetrical buckling portion has a hexagonal cross-sectional configuration and the elongated groove replaces at least one flat of the hexagonal cross-section In another embodiment, said elongated groove is a cold formed groove that replaces one flat of the hexagonal cross-section holding feature and is about 3 millimeters in depth, about 16 millimeters in length, and about 6 millimeters in width. In yet another embodiment, said elongated groove is a cold formed groove that replaces two adjacent flats of the hexagonal holding feature and is about 2 millimeters in depth, about 16 millimeters in length, and about 4 millimeters in width.

In yet other embodiments, said elongated groove has a depth in the range of from 1 millimeter to 7 millimeters, said elongated groove has a width in the range of from 5 millimeters to 10 millimeters, and/or said elongated groove has a length in the range of from 12 millimeters to 12 millimeters.

Yet another aspect of the present disclosure is a linkage system, comprising: a relay rod connected to a chassis of a vehicle by two pivoting members, the two pivoting members being connected to the relay rod by ball and socket assemblies; and a pair of tie rod assemblies each connected to the relay rod at a first end and to an associated wheel bracket at a second end, the tie rod assemblies comprising an inner tie rod and an outer tie rod; each inner tie rod having a stud having a ball end portion received in a socket and supported for pivotal movement relative to said socket, said stud having shank portion projecting from said socket and centered on a longitudinal axis; said shank portion of said ball stud including a holding feature which facilitates threaded engagement of the shank with an outer tie rod; an elongated groove formed in the holding feature forming an asymmetrical buckling portion; the linkage system, when exposed to an amount of force, is configured such that the inner tie rod will buckle at the asymmetrical buckling portion prior to the relay rod or the two pivoting members buckling under the amount of force.

One embodiment of the linkage system is wherein the inner tie rod buckles at the asymmetrical buckling portion when exposed to force in a range of about 30 kN to about 40 kN.

Another embodiment of the linkage system is wherein the tie rod buckles at the asymmetrical buckling portion when exposed to force in a range of about 31.2 kN to about 32.8 kN.

Yet another embodiment of the linkage system is wherein said elongated groove replaces one flat of holding feature having a hexagonal cross-sectional configuration, the elongated groove being cold formed with the holding feature and being about 3 millimeters in depth, about 16 millimeters in length, and about 6 millimeters in width.

Still yet another embodiment of the linkage system is wherein said elongated groove replaces two flats of holding feature having a hexagonal cross-sectional configuration, the elongated groove being cold formed with the holding feature and being about 2 millimeters in depth, about 16 millimeters in length, and about 4 millimeters in width.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE PREFERRED EMBODIMENTS

The present disclosure relates to a linkage member having a portion that is designed to buckle under a predetermined axial load. The present invention is applicable to various linkage constructions.

Various types of steering linkage systems are used to control the steering of an automotive vehicle. A well-known type of steering linkage system has a relay rod connected to the frame or chassis of an automobile by two pivoting members, such as a pitman arm and an idler. In this type of arrangement the relay rod shifts back and forth laterally in response to steering input from the steering wheel of the automobile via a steering gear. The pivoting members are connected to the relay rod by ball and socket assemblies. The opposite end portions of the relay rod are each connected to a steering knuckle by a tie rod assembly.

In certain embodiments, the tie rod assemblies are connected to the relay rod by ball and socket assemblies. The steering knuckles turn the front wheels of the automobile to steer the automobile in response to movements of the relay rod and tie rods that connect the relay rod to the steering knuckles. The steering knuckles are connected to suspension members by ball and socket assemblies. Some steering linkage systems also include a drag link for moving the relay rod. In certain embodiments, the inner end of the tie rod is connected to a corresponding end of the relay rod by a ball and socket assembly.

In general, the present invention is directed to linkage member having a portion that is designed to buckle under a narrow predetermined axial load window (max and min limits). The embodiments shown herein are more particularly directed to an improved inner tie rod ball stud in a vehicle steering linkage system. The present disclosure is adapted to provide improved performance without requiring modification of the other components associated with the vehicle steering linkage system.

Figure 1A:
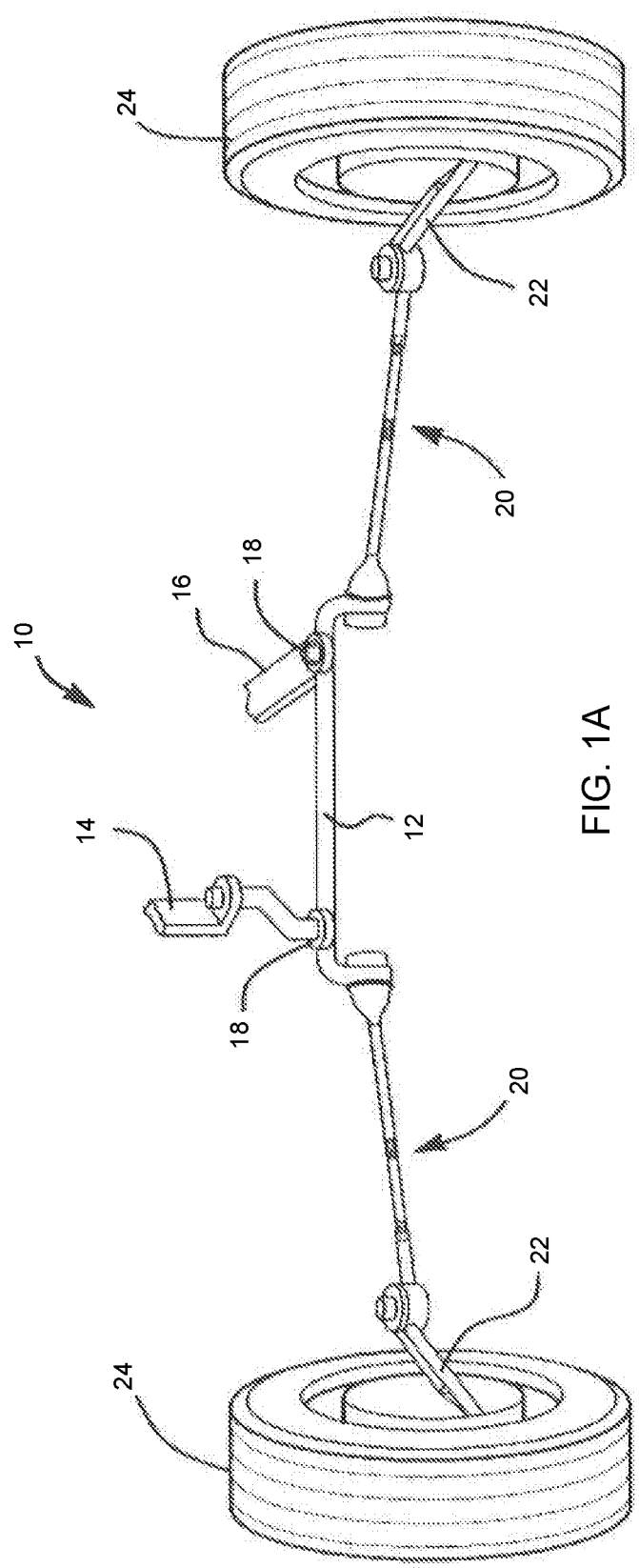
FIG. 1A shows a partial schematic view of a vehicle having a steering linkage according to the principles of the present disclosure.

FIG. 1A is a partial schematic view of the front end of an automotive vehicle showing a steering linkage system 10. The steering linkage system 10 generally comprises a relay rod 12 that is connected to the frame or chassis (not shown) of the automotive vehicle by two pivoting members, such a pitman arm 14 and an idler arm 16. The relay rod 12, the chassis, the pitman arm 14 and the idler arm 16 are formed so that the relay rod 12 moves laterally in response to steering input from a steering wheel (not shown) which operates a steering gear (not shown) to rotate the pitman arm 14. The pitman arm 14 and idler arm 16 are connected to the relay rod 12 by ball and socket assemblies 18. Each of a pair of tie rod assemblies 20 are connected to the relay rod 12 at a first end and to an associated wheel bracket 22 at a second end. The front wheels 24 are turned in response to lateral movements of the relay rod 22 via the tie rod assemblies 20.

Figure 1B:
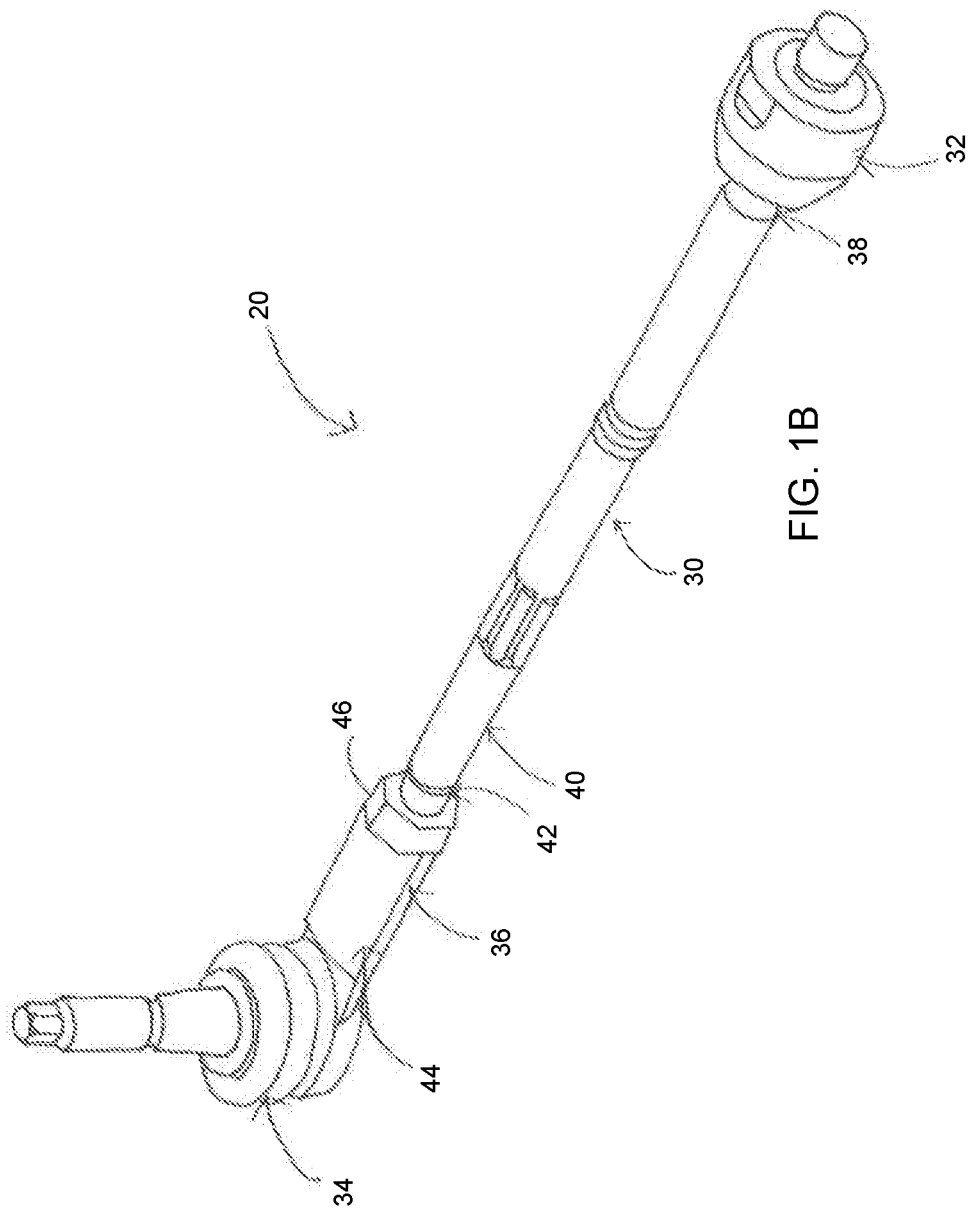
FIG. 1B shows a perspective view of a portion of the steering linkage of FIG. 1A showing a tie rod assembly.

With particular reference to FIG. 1B, a tie rod assembly 20 is illustrated to include a rod member 30, first and second ball and socket assemblies 32 and 34, respectively, and a threaded member 36. The rod member 30 includes a first end 38 that is coupled to the first ball and socket assembly 32 and a second end 40 having a threaded portion 42. In the particular embodiment illustrated, rod member 30 also includes an adjustment segment 44, or outer tie rod.

Still referring to FIG. 1B, the outer tie rod 44 has an outer end portion that is formed as a ball joint 34 for connection with the steering knuckle. The ball joint 34 has a pivot center for the outer tie rod 44. An inner end portion 36 of the outer tie rod 44 is formed as an internally threaded sleeve. The externally threaded end portion 54 of the ball stud 30 is screwed into the internally threaded end portion 36 of the outer tie rod 44, to secure the two pieces together. A nut 46 on the outer tie rod 44 locks the two pieces together.

The tie rod assembly 20 thus extends between the rack 12 and the steering knuckle 22. The tie rod assembly 20 interconnects the rack 12 and the steering knuckle 22 in a force-transmitting relationship. The length of the tie rod assembly 20 is adjustable by loosening the nut 46, rotating the ball stud 30 of the inner tie rod relative to the socket 32 and to the outer tie rod 44, and retightening the nut. The shank portion 50 of the ball stud 30 has a substantially uniform diameter along its length, centered on the axis 52. If sufficient compressive force is applied along the axis 52 of the ball stud 30, as may occur during use of the vehicle as discussed above, the shank portion 50 will tend to buckle. It is desirable to control the location of buckling of the shank portion 50, that is, to ensure that it buckles, if at all, at a predetermined location along its length. In addition, it is desirable to control the amount of force needed to make the linkage member, i.e., the ball stud 30, buckle. To this end, the shank portion 50 of the ball stud 30 is provided with a predetermined weakened portion, or buckle portion 56. Preferably, the buckle portion 56 of the ball stud 30 is located at about the axial center (from end to end) of the tie rod assembly 20.

One embodiment of a vehicle steering linkage includes a tie rod assembly 20 that extends between and interconnects one end of the rack and a steering knuckle, which is connected with a steerable wheel of the vehicle (as shown in FIG. 1A). When the steering gear is actuated, the tie rod assembly 20 transmits force from the rack 12 to the steering knuckle 34 to effect steering movement of the steerable wheel 24. The tie rod assembly 20 includes an inner tie rod 30 and an outer tie rod 44. The inner tie rod 30 includes a socket 32 and also includes the linkage member 30, which is formed as a ball stud. The socket 32 has a threaded end portion that is screwed into the rack. The socket 32 is thus fixed for movement with the rack. The socket 32 defines a pivot center for the ball stud 30.

Figure 1C:
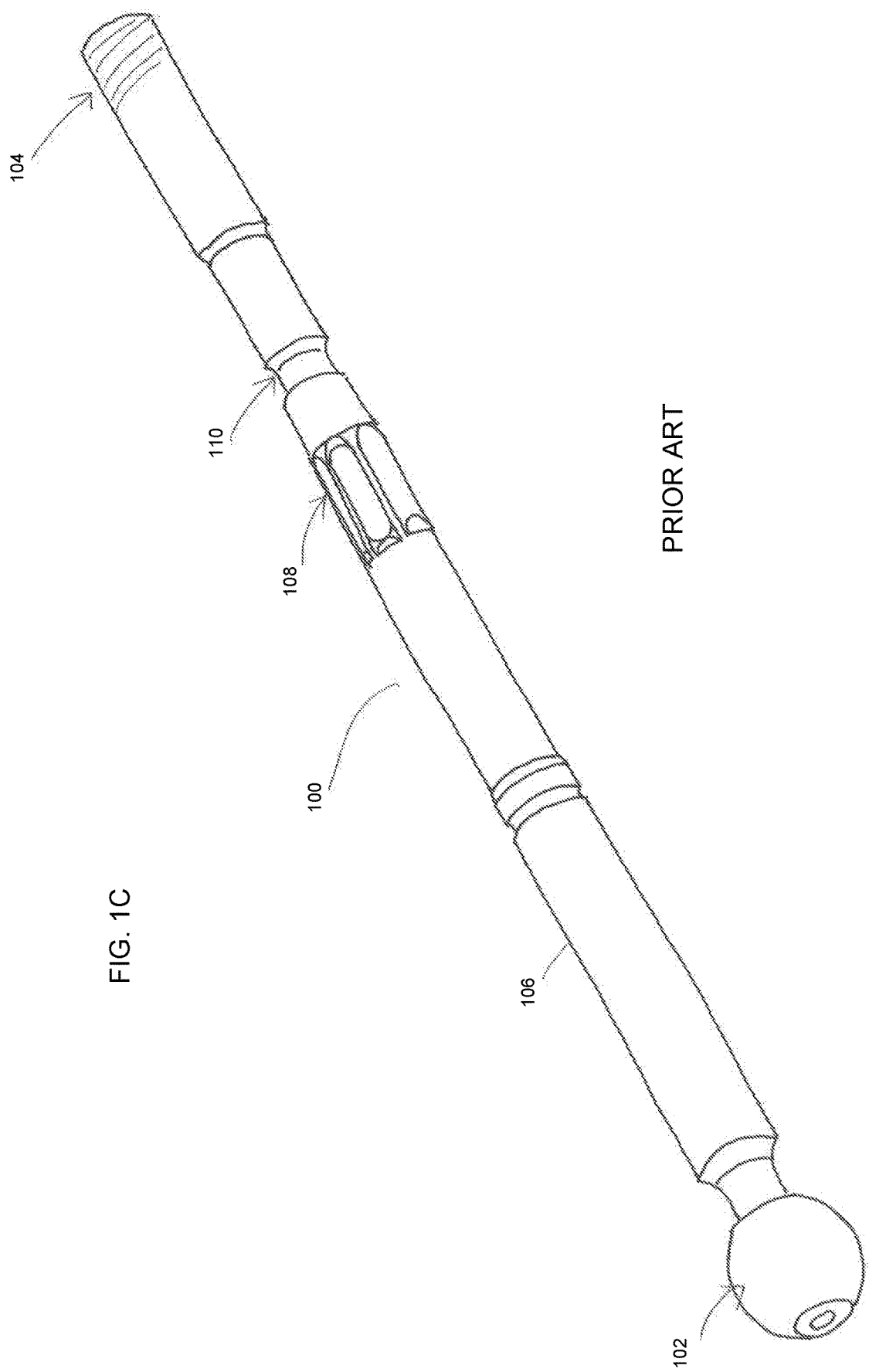
FIG. 1C shows a perspective view of an inner tie rod ball joint stud according to the prior art.

FIG. 1C shows an inner tie rod ball stud according to the prior art. More specifically, the ball stud 100 has a ball end portion 102 and a shank portion 106. The ball end portion 102 of the ball stud 100 is received in the socket (not shown). The ball end portion 102 of the ball stud 100 supports the ball stud on the rack for pivotal movement relative to the rack about the pivot center. The shank portion 106 of the ball stud 100 extends from the ball end portion 102 to a threaded end 104 portion opposite the ball end portion 48, for engagement with the outer tie rod (not shown). The shank portion 106 has a cylindrical, rod-shaped configuration centered on a longitudinal axis. The shank portion 106 has a holding feature 108 and a buckle region 110 that has been machined on a lathe to remove material thickness in the buckle region to create an area of weakness along the length of the shank 106.

Figure 2:
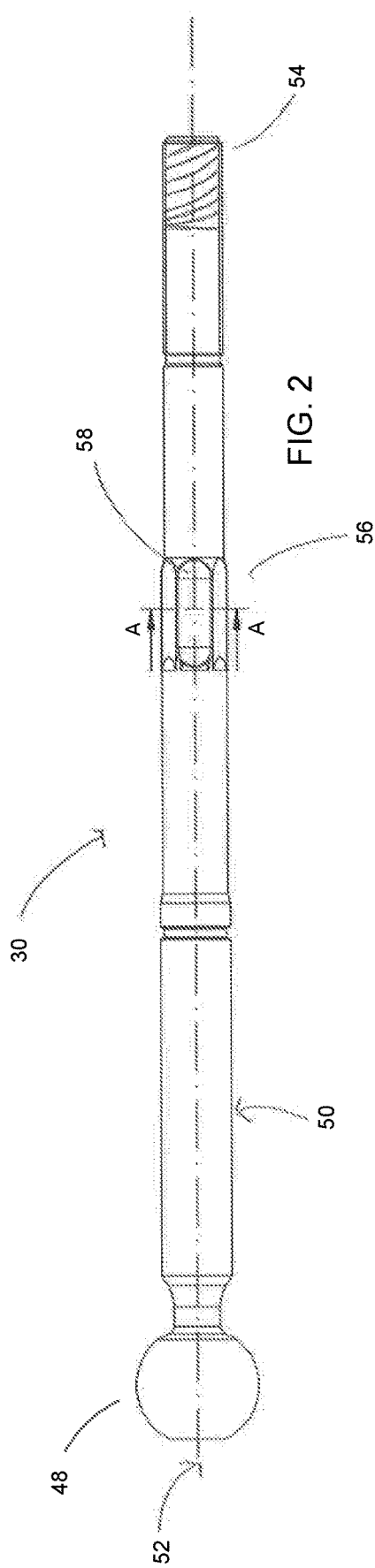
FIG. 2 shows a side view of an inner tie rod ball joint stud according to the principles of the present disclosure.

FIG. 2 shows one embodiment of an inner tie rod ball stud 30 of the present disclosure. The ball stud 30 is preferably made as one piece from a single, homogeneous piece of material, such as carbon steel. The ball stud 30 may be formed by cold heading and heat treating of a steel rod. Cold forming is a process of forging metals at near room temperatures. In cold forming metal is formed at high speed and high pressure into tool steel or carbide dies. The cold working of the metal increases the hardness, yield, and tensile strengths. Cold heading is similar but specifically refers to the upsetting of a volume of metal into a head. Cold forming and cold heading processes are flexible. Parts can be hit multiple times while staying in one die ("one die, multiple blow"), or transferred from die to die to progressively form various geometries ("multi-die forming").

In one embodiment of the inner tie rod ball stud of the present disclosure, the buckle portion 56 is provided in an area of the shank portion 50 that has a generally hexagonal cross section but has an elongate groove 58 on only one side. The buckle portion 56 is formed by creating an elongate groove 58, on the shank portion 50 of the ball stud 30. This groove 58 is formed during the cold forming stage of manufacture. This is in contrast to conventional inner tie rod buckle portions that are symmetrical and are formed by turning a work piece on a lathe. In certain embodiments, the hexagonal cross section, or holding feature, is configured to engage with a wrench when the inner tie rod ball stud is installed, or adjusted, within a steering linkage of a vehicle.

Still referring to FIG. 2, the ball stud 30 has a ball end portion 48 and a shank portion 50. The ball end portion 48 of the ball stud 30 is received in the socket (not shown). The ball end portion 48 of the ball stud 30 supports the ball stud on the rack for pivotal movement relative to the rack about the pivot center. The ball stud 30 has a longitudinal axis 52 that extends through the center of the ball end portion 48. The ball stud axis 52 may be coincident with the steering axis, or may be skewed relative to the steering axis when the tie rod assembly 20 is moved relative to the rack. The shank portion 50 of the ball stud 30 extends from the ball end portion 48. The shank portion 50 has a cylindrical, rod-shaped configuration centered on the axis 52. The shank portion 50 has a threaded outer end portion 54, opposite the ball end portion 48, for engagement with the outer tie rod (not shown).

Figure 3:
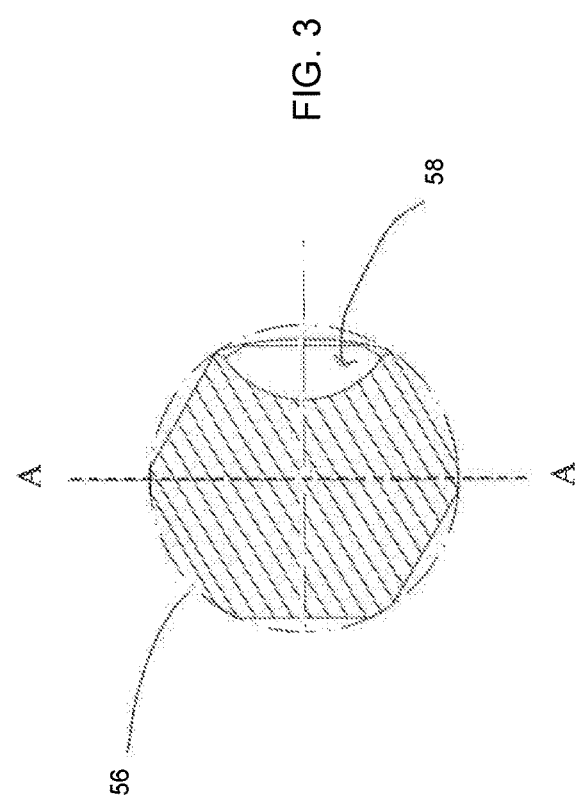
FIG. 3 shows a sectional view of the inner tie rod ball joint stud of FIG. 2.

Referring to FIG. 3, a sectional view of the buckling feature of the inner tie rod ball joint stud of FIG. 2 is shown. More specifically, the cross-section is at the buckle portion 56 in the illustrated embodiment. In this embodiment, an elongate groove 58 replaces one side of the hexagon. The axis 52 of the ball stud 30 extends through the buckle portion 56. The hexagonal outer surface of the buckle portion 56 is centered on the axis. However, the groove 58 is located to one side of the axis to provide for asymmetrical buckling. In one embodiment, the elongated groove has a length, a width, and a depth. The buckle portion 56 thus constitutes a section of the shank portion 50 of the ball stud 30 that is intentionally missing along one side of the shank portion to one side of the axis 52.

As a result, the buckle portions 56 of the ball studs 30 will be the portions of the ball studs that are most likely to buckle under axial compressive load. The ball studs 30 will buckle at the buckle portions 56, as opposed to at some other location along the length of the ball studs, because of the asymmetrical buckling groove 58 of the buckle portions 56. Therefore, when ball studs like the ball stud 30 are incorporated into tie rod assemblies like the tie rod assembly 20, the tie rod assemblies will buckle at their buckle portions 56, rather than elsewhere along the length of the tie rod assemblies.

In addition, the amount of force needed to buckle the ball stud 30 of the present disclosure is dependent on the extent of the asymmetrical buckling groove 58 at the buckle portion 56. Because each ball stud 30 manufactured in this way with this buckle portion 56 has the same depth and width at the asymmetrical buckling groove 58 at the buckle portion 56, each one of the ball studs will buckle under the same, predetermined, applied load. Therefore, the buckling characteristics of the tie rod assembly 20 are known in advance both by location, and by amount of force.

In one embodiment of the ball stud 30 constructed in accordance with the present disclosure, the shank portion 50 of the ball stud has a diameter of about 16 millimeters. In one embodiment, the buckle portion 56 has a total end to end length of about 27 millimeters. The elongated groove has a length of 16, a width of 7 and a depth of 3 millimeters at its greatest depth and a total length of 23 millimeters.

The present disclosure is applicable to linkage members, such as ball studs, having different dimensions. In some cases, the linkage members have a shank portion with a diameter in the range of from about 9 millimeters to about 25 millimeters, although the diameter could be different. The buckle portion of such a ball stud may have a diameter in the range of from about 9 millimeters to about 22 millimeters.

The elongated groove may have a depth from about 1 to about 7 millimeters, or more. The elongated groove may have a width from about 5 to about 10 millimeters, or more. The elongated groove may have a length from about 12 to about 25 millimeters, or more.

One embodiment of the present disclosure is to replace one flat of the hexagon holding feature with a cold formed groove of 3 millimeters in depth, 16 millimeters in length, and 6 millimeters in width. Another embodiment is to replace two adjacent flats of the hexagonal holding feature with a cold formed groove of 2 millimeters in depth, 16 millimeters in length, and 4 millimeters in width. In some cases, the groove may be formed in the pre-roll diameter section of the inner tie rod ball stud, provided that there is sufficient length.

The present disclosure provides for predictable buckling without an additional process to the manufacturing of the ball stud, thus increased accuracy and predictability is possible with no increase to cost. In certain embodiments, the buckling feature can be formed at the same time the hexagonal holding feature is being formed. The presence of the groove drives the force of a buckling event asymmetrically through the inner tie rod ball stud near the area of failure, which influences the tie rod assembly to buckle in the direction of the groove, thus negating the effects of inner tie rod ball stud run-out tolerances.

In one embodiment of the asymmetrical buckling groove of the present disclosure, the buckling range for the inner tie rod was reduced by half and the standard deviation was reduced by a factor of 2.5 as compared to conventional inner tie rods. In some cases, the load carrying capacity was not reduced as the buckling occurred in the same range as in unmodified parts, but the buckling occurred within a much smaller window. Conventional tie rods buckle in the range of 35-40 kN. In certain embodiments of the present disclosure, the grooved tie rods buckled in the range of 31.2 kN-32.8 kN, which is slightly lower, but much more predictable than the conventional tie rods tested.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A linkage member comprising:
a shank defining a longitudinal axis and having a ball adjacent a first end and a threaded portion adjacent a second end;
the shank having a holding feature which facilitates threaded engagement of the shank with an outer tie rod; and
an elongated groove being formed in the holding feature forming an asymmetrical buckling portion, and said asymmetrical buckling portion buckling under a predetermined amount of axially applied force applied to the shank.

2. The linkage member as set forth in claim 1, wherein the asymmetrical buckling portion has a hexagonal cross-sectional configuration and the elongated groove replaces at least one flat of the hexagonal cross-section.

3. The linkage member as set forth in claim 2, wherein said elongated groove is a cold formed groove that replaces one flat of the hexagonal cross-section holding feature and is about 3 millimeters in depth, about 16 millimeters in length, and about 6 millimeters in width.

4. The linkage member as set forth in claim 2, wherein said elongated groove is a cold formed groove that replaces two adjacent flats of the hexagonal holding feature and is about 2 millimeters in depth, about 16 millimeters in length, and about 4 millimeters in width.

5. The linkage member as set forth in claim 1, wherein said shank has a diameter in the range of from about 9 millimeters to about 25 millimeters, and said shank at said asymmetrical buckling portion has a diameter in the range of from about 9 millimeters to about 22 millimeters.

6. The linkage member as set forth in claim 2, wherein said elongated groove has a depth in the range of from 1 millimeter to 7 millimeters.

7. The linkage member as set forth in claim 2, wherein said elongated groove has a width in the range of from 5 millimeters to 10 millimeters.

8. The linkage member as set forth in claim 2, wherein said elongated groove has a length in the range of from 12 millimeters to 25 millimeters.

9. A vehicle steering linkage member comprising:
a socket; and
a stud having a ball end portion received in said socket and supported for pivotal movement relative to said socket, and said stud having a longitudinal axis, said stud having a shank portion projecting from said socket and centered on said axis;
said shank portion of said ball stud including a holding feature, which facilitates threaded engagement of the shank with an outer tie rod;
an elongated groove being formed in the holding feature forming an asymmetrical buckling portion, and said asymmetrical buckling portion buckling under a predetermined amount of axially applied force applied to the shank.

10. The linkage member as set forth in claim 9, wherein the asymmetrical buckling portion has a hexagonal cross-sectional configuration and the elongated groove replaces at least one flat of the hexagonal cross-section.

11. The linkage member as set forth in claim 10, wherein said elongated groove is a cold formed groove that replaces one flat of the hexagonal cross-section holding feature and is about 3 millimeters in depth, about 16 millimeters in length, and about 6 millimeters in width.

12. The linkage member as set forth in claim 10, wherein said elongated groove is a cold formed groove that replaces two adjacent flats of the hexagonal holding feature and is about 2 millimeters in depth, about 16 millimeters in length, and about 4 millimeters in width.

13. The linkage member as set forth in claim 9, wherein said elongated groove has a depth in the range of from 1 millimeter to 7 millimeters.

14. The linkage member as set forth in claim 9, wherein said elongated groove has a width in the range of from 5 millimeters to 10 millimeters.

15. The linkage member as set forth in claim 9, wherein said elongated groove has a length in the range of from 12 millimeters to 25 millimeters.

16. A linkage system comprising:
a relay rod connected to a chassis of a vehicle by two pivoting members, and the two pivoting members being connected to the relay rod by ball and socket assemblies; and
a pair of tie rod assemblies each connected to the relay rod at a first end and to an associated wheel bracket at a second end, and the tie rod assemblies comprising an inner tie rod and an outer tie rod;
each inner tie rod having a stud having a ball end portion received in a socket and supported for pivotal movement relative to said socket, said stud having shank portion projecting from said socket and centered on a longitudinal axis; said shank portion of said ball stud including a holding feature which facilitates threaded engagement of the shank with an outer tie rod;
an elongated groove formed in the holding feature forming an asymmetrical buckling portion;
the linkage system, when exposed to an amount of force, is configured such that the inner tie rod will buckle at the asymmetrical buckling portion prior to the relay rod or the two pivoting members buckling under the amount of force.

17. The linkage system according to claim 16, wherein the inner tie rod buckles at the asymmetrical buckling portion when exposed to force in a range of about 35 kN to about 40 kN.

18. The linkage system according to claim 16, wherein the tie rod buckles at the asymmetrical buckling portion when exposed to force in a range of about 31.2 kN to about 32.8 kN.

19. The linkage system according to claim 16, wherein said elongated groove replaces one flat of holding feature having a hexagonal cross-sectional configuration, the elongated groove being cold formed with the holding feature and being about 3 millimeters in depth, about 16 millimeters in length, and about 6 millimeters in width.

20. The linkage system according to claim 16, wherein said elongated groove replaces two flats of holding feature having a hexagonal cross-sectional configuration, the elongated groove being cold formed with the holding feature and being about 2 millimeters in depth, about 16 millimeters in length, and about 4 millimeters in width.

* * * * *